United States Patent [19]

Fujio et al.

[11] 3,931,097

[45] Jan. 6, 1976

[54] ETHYLENE-PROPYLENE COPOLYMER RUBBER COMPOSITION HAVING HIGH MODULUS

[75] Inventors: Ryota Fujio, Akigawa; Nobuyuki Kataoka, Tokyo; Motozumi Kitayama, Tachikawa; Yoshihide Fukabori; Shiro Anzai, both of Higashi-Murayama, all of Japan

[73] Assignee: Bridgestone Tire Company Limited, Tokyo, Japan

[22] Filed: Dec. 4, 1974

[21] Appl. No.: 529,426

[30] Foreign Application Priority Data
Dec. 4, 1973 Japan................................ 48-134835
June 23, 1974 Japan.................................. 49-9230

[52] U.S. Cl. ........ 260/42.21; 260/42.33; 260/42.42; 260/45.75 N; 260/45.8 NT; 260/45.95 F; 260/878 R
[51] Int. Cl.².. C08K 3/04; C08K 3/22; C08L 23/26
[58] Field of Search........... 260/42.21, 42.33, 42.42, 260/878 R

[56] References Cited
UNITED STATES PATENTS
3,179,715  4/1965  Natta et al...................... 260/878 R
3,632,680  1/1972  Hunt et al....................... 260/878 R

*Primary Examiner*—James H. Derrington
*Attorney, Agent, or Firm*—Sughrue, Rothwell, Mion, Zinn & Macpeak

[57] ABSTRACT

An ethylene-propylene copolymer rubber composition having a high Young's modulus, which comprises 100 parts by weight of a mixture of the following ingredients (a) and (b) in a weight ratio of ingredient (a)/ingredient (b) of 67/33–50/50, said ingredient (a) being an ethylene-propylene copolymer having a Mooney viscosity of at least 75, said ingredient (b) being divinylbenzene, (c) 0.3–2.5 parts by weight of an organic peroxide, and (d) 0.01–0.25 part by weight of sulfur, and the homogeneous rubber composition cured at 120°–180°C having a Young's modulus of 200–500 Kg/cm², a tensile strength of at least 200 Kg/cm², an elongation of at least 300%, a tear energy of at least 10 Kg/cm and retentions of Young's modulus and tensile strength at 70°C of at least 50%.

15 Claims, No Drawings

ETHYLENE-PROPYLENE COPOLYMER RUBBER COMPOSITION HAVING HIGH MODULUS

BACKGROUND OF THE INVENTION

1. Field of the Invention

The present invention relates to a one shot mouldable and curable homogeneous rubber composition having a high Young's modulus.

2. Description of the Prior Art

Conventional rubber compositions composed of rubber and various compounding ingredients have a low Young's modulus, and when it is intended to use the rubber composition in a portion, wherein a high mechanical strength is required, it has been necessary to use the rubber composition in the form of a laminate combined with fibers and other reinforcing materials.

However, it is troublesome to effect laminating and moulding, and moreover, the resulting moulded articles are often poor in the homogeneity. There have been known several rubber compositions composed of ethylene-propylene copolymer, monomer, organic peroxide, and one shot moulded articles prepared therefrom. However, rubber compositions having well-balanced physical properties in such a high level that are aimed in the present invention have never hitherto been obtained. For example, British Pat. No. 896,598 and Journal of the Society of Rubber Industry Japan, 42, 921(1966) disclose methods wherein a rubber composition composed of ethylene-propylene copolymer, divinylbenzene and organic peroxide is heated and cured. However, the resulting cured product is still insufficient in the balance of the Young's modulus, tensile strength and tear energy at room temperature, the retentions of Young's modulus, tensile strength and tear energy at high temperature (about 70°C), the creeps at room temperature and at 70°C, and other physical properties.

The present invention provides a homogeneous one shot mouldable rubber composition, which simultaneously has high Young's modulus, tensile strength, elongation, tear energy and retention of physical properties at high temperature (70°C) and a low creep in a well-balanced state without the use of reinforcing material, such well-balanced physical properties having never been attained without the use of reinforcing material by the conventional rubber compositions.

SUMMARY OF THE INVENTION

The rubber composition having a high Young's modulus of the present invention is characterized in that the rubber composition comprises 100 parts by weight of a mixture of the following ingredients (a) and (b) in a weight ratio of ingredient (a)/ingredient (b) of 67/33–50/50, said ingredient (a) being an ethylene-propylene copolymer having a Mooney viscosity of at least 75, which may contain unsaturated third component, said ingredient (b) being divinylbenzene, (c) 0.3–2.5 parts by weight of an organic peroxide, and (d) 0.01–0.25 part by weight of sulfur, and the homogeneous rubber composition cured at 120–180°C having a Young's modulus of 200–500 Kg/cm$^2$, a tensile strength of at least 200 Kg/cm$^2$, an elongation of at least 300%, a tear energy Γ of at least 10 Kg/cm and retentions of Young's modulus and tensile strength at 70°C of at least 50%.

The moulded articles produced from the rubber composition of the present invention have sufficiently high mechanical strength without the use of reinforcing materials, such as fibers and the like, and are very small in the permanent deformation, and are excellent in the low temperature resistance and air-tightness, and further are very light and inexpensive.

The inventors have further made various investigations with respect to the above described rubber composition, and found out that, when a particularly limited several kinds of ultraviolet absorbing agents are added to the rubber composition, the light stability of the cured product of the rubber composition can be improved without affecting adversely the curing rate, the polymerization velocity of monomers and the low shrinkage of the composition in the curing, and further without deteriorating the Young's modulus, tensile strength, tear energy, retentions of Young's modulus and tensile strength, and other physical properties of the cured rubber.

Therefore, the rubber composition of the present invention is remarkably useful as a material for producing one shot moulded articles, which are used under severe temperature and mechanical conditions, such as vibration insulating rubber, bumper, tire, flexible joint, guide roller, dock fender, belt, hose, packing material, joint sealing element, sealing material and other water-resistant material, heat-resistant material, low-temperature resistant material and the like. Of course, the rubber composition can be widely used similarly to conventional rubber materials.

DESCRIPTION OF THE PREFERRED EMBODIMENTS

The rubber composition having a high Young's modulus aimed in the present invention comprises 100 parts by weight of a mixture of the following ingredients (a) and (b) in a weight ratio of ingredient (a)/ingredient (b) of 67/33–50/50, said ingredient (a) being an ethylene-propylene copolymer having a Mooney viscosity of at least 75, which may contain an unsaturated third component, said ingredient (b) being divinylbenzene, (c) 0.3–2.5 parts by weight of an organic peroxide, and (d) 0.01–0.25 part by weight of sulfur.

Further, when the following ingredient, (e) 0.1–5.0 parts by weight of an ultraviolet absorbing agent, or (e') 0.1–10.0 parts by weight of carbon black and/or red iron oxide, is added to the above described rubber composition composed of the ingredients (a)–(d), the light stability of the cured rubber is remarkably improved.

The ethylene-propylene copolymer to be used in the present invention includes two-component copolymer composed of ethylene and propylene, and multi-component copolymer composed of ethylene, propylene and an unsaturated component, and should be a rubbery copolymer having a Mooney viscosity of at least 75 and containing 40–80% of ethylene unit, 60–20% of propylene unit and 0–10% of unsaturated component unit. Of course, mixtures composed of at least two ethylene-propylene copolymers and having a Mooney viscosity of at least 75 are included in the scope of the present invention.

The rubber composition having a high Young's modulus of the present invention is composed of the above described 4 or 5 essential ingredients. Among these ingredients, divinylbenzene serves to increase the Young's modulus and the physical properties at high temperature of the rubber composition in the cured state.

In the present invention, the weight ratio of rubber/divinylbenzene is very important, and should be within the range of 67/33–50/50, preferably 65/35–55/45. When the weight ratio of rubber/divinylbenzene is larger than 67/33, the Young's modulus and tear energy Γ of the cured rubber are decreased, while when the weight ratio is smaller than 50/50, the cured rubber has an extremely high Young's modulus an low tear energy Γ and elongation, and therefore cured rubbers having the above described physical properties aimed in the present invention cannot be obtained.

The organic peroxide to be used in the present invention includes dialkyl peroxides, such as dicumyl peroxide, di-t-butyl peroxide, 1,1-di-t-butyl-3,3,5-trimethyl-peroxycyclohexane, t-butyl cumyl peroxide, 2,5-dimethyl-2,5-di-t-butylperoxyhexane and the like. Among them, dicumyl peroxide is particularly preferable.

The amount of the organic peroxide is important in order to attain the object of the present invention. The organic peroxide has two rolls. The one is to act as an initiator which causes polymerization of divinylbenzene to form a polymer. The other is to act as a crosslinking agent which causes crosslinking reaction between the above formed polymer and the previously compounded ethylene-propylene copolymer to form a cured copolymer having a three-dimensional structure. In order to attain this objects, it is necessary to use the organic peroxide in an amount of 0.3–2.5 parts by weight, preferably 0.5–1.5 parts by weight.

Sulfur is added to the rubber composition of the present invention in order to give a high Young's modulus to the cured rubber without deteriorating the tear resistance. In order to develop the effect of the sulfur, it is necessary to add sulfur in an amount of 0.01–0.25 part by weight, preferably 0.03–0.16 part by weight. When the addition amount of sulfur is smaller than the lower limit of the above described range, the Young's modulus and tear energy Γ of the cured rubber are lower than the desired values.

Ultraviolet absorbing agent is added to the rubber composition of the present invention in order to give a remarkably high light stability to the cured rubber without deteriorating the excellent physical properties at room temperature and the excellent retention of physical properties at high temperature (70°C). As the ultraviolet absorbing agent, mention may be made of (1) benzophenone series compounds, (2) benzotriazole series compounds, (3) chelated nickel compounds, (4) a combination of (1) and (3), and the like. In the present invention, the following compounds are preferably used, that is, as the compounds of group (1), 2-hydroxy-4-n-octoxybenzophenone; as the compounds of group (2), 2'-hydroxy-4'-n-octoxybenzotriazole, and 6-chloro-2-(2'-hydroxy-3'-t-butyl-5'-methyl)benzotriazole; as the compounds of group (3), 2,2'-thiobis-(4-t-octyl phenolate)-n-butylamine nickel, and nickel dibutyldithiocarbamate; and as the compounds of group (4) a mixture of 2-hydroxy-4-n-octoxybenzophenone and nickel dibutyldithiocarbamate, and the like.

Among them, 6-chloro-2-(2'-hydroxy-3'-t-butyl-5'-methyl)benzotriazole and a mixture of 2-hydroxy-4-n-octoxybenzophenone and nickel dialkyldithiocarbamate in the same weight are particularly preferable. The ultraviolet absorbing agent is used in an amount of 0.1–5.0 parts by weight, preferably 0.5–4.0 parts by weight.

In the present invention, when ingredient (e) of ultraviolet absorbing agent, which is added to the rubber composition composed of the ingredients (a)–(d) in order to give a remarkably high light stability to the cured rubber without deteriorating the excellent physical properties at room temperature and the excellent retention of physical properties at high temperature (70°C), is replaced by ingredient (e') of carbon black and/or red iron oxide, ingredient (e'') of a mixture of ultraviolet absorbing agent annd pigment, or ingredient (e''') of a mixture of ultraviolet absorbing agent and at least one of carbon black and red ion oxide, such object can be attained also. In this case, the ingredient (e'), (e'') is used in an amount of 1–10 parts by weight.

As the pigment used in the ingredient (e''), any pigments used in the conventional rubber and plastic industries can be used, and particularly Phthalocyanine Green and Parmanent Carmine are preferably used. As the ultraviolet absorbing agent to be used in combination with carbon black and/or red iron oxode in the ingredient (e'''), chelated nickel compounds are preferable.

The above described rubber composition of the present invention is easily cured by heating at a temperature of about 120–180°C, preferably about 140–170°C, for 1–90 minutes, preferably 3–40 minutes, and the resulting cured rubber has high Young's modulus and tensile strength and a low creep, and is excellent in the tear resistance and heat resistance, and further can maintain these excellent physical properties within a broad temperature range.

The following examples are given for the purpose of illustration of this invention and are not intended as limitations thereof. In the examples, the "part" means part by weight unless otherwise specified.

EXAMPLE 1 AND COMPARATIVE EXAMPLE 1

The following ingredients, (a) ethylene-propylene copolymer containing ethylidenenorbornene as an unsaturated third component, which has a Mooney viscosity of 90, an ethylene/propylene ratio of 70/30 and an iodine value of 12 (hereinafter this copolymer is referred to as E-1), (b) divinylbenzene, (c) dicumyl peroxide and (d) sulfur were kneaded according to the following Compounding Recipe 1 at room temperature by means of a mixing roll. The resulting homogeneous rubber compositions were heated and cured at 155°C for 30 minutes to produce cured rubber sheets.

| | Compounding Recipe 1 | | | |
|---|---|---|---|---|
| | Ingredient | | Example 1 | Comparative Example 1 |
| (a) | E-1 | (part) | 58.5 | 58.5 |
| (b) | Divinylbenzene | (part) | 41.5 | 41.5 |
| (c) | Dicumyl peroxide | (part) | 1.0 | 1.0 |
| (d) | Sulfur | (part) | 0.15 | 0 |

Physical properties of the above obtained cured rubber sheets are shown in the following Table 1.

Table 1

| Physical property | | Example 1 | Comparative Example 1 |
|---|---|---|---|
| Tensile strength at room temperature | (Kg/cm$^2$) | 328 | 336 |
| Elongation at room temperature | (%) | 370 | 350 |
| Modulus at room temperature[1] | (Kg/cm$^2$) | 308 | 179 |
| Tear energy at room temperature[2] | (Kg/cm) | 13 | 13 |
| Creep at room temperature[3] (20 Kg/cm$^2$ stress) | (%) | 1.3 | 3.9 |
| Creep at 70°C[3] (20 Kg/cm$^2$ stress) | (%) | 0.9 | 2.8 |
| Retention of tensile strength at 70°C[4] | (%) | 53 | 45 |
| Retention of elongation at 70°C[4] | (%) | 76 | 88 |
| Retention of modulus at 70°C[4] | (%) | 66 | 55 |

Note:
[1]Young's modulus measured under 10% elongation.
[2]Tear energy was measured in the following manner. A cut having a length of 2 mm is made to a stripshaped rubber sample having a length of 60 mm, a width of 10 mm and a thickness of 2 mm from the side at the center portion of the length of the sample in a direction perpendicular to the longitudinal direction of the sample, and the energy required for tearing the sample is measured. The higher the value, the more excellent tear characteristics the sample has.
[3]Creep (24 hours) - Creep (1 hour)
[4] $\frac{\text{Value at 70°C}}{\text{Value at room temperature}} \times 100$ (%)

As seen from Table 1, when sulfur is added to a rubber composition, the Young's modulus of the cured rubber sheet is improved remarkably, and further the retentions of tensile strength and Young's modulus at 70°C of the sheet are improved, and the creeps at room temperature and 70°C of the sheet are considerably low.

EXAMPLES 2 AND 3 AND COMPARATIVE EXAMPLES 2 TO 4

The following ingredients, (a) ethylene-propylene copolymer E-1, (b) divinylbenzene, (c) dicumyl peroxide and (d) sulfur were kneaded according to the following Compounding Recipe 2 at room temperature by means of a mixing roll. The resulting homogeneous rubber compositions were heated and cured at 155°C for 30 minutes to produce cured rubber sheets.

| Ingredient | | | Compounding Recipe 2 | | | | |
|---|---|---|---|---|---|---|---|
| | | | Example | | Comparative Example | | |
| | | | 2 | 3 | 2 | 3 | 4 |
| (a) | E-1 | (part) | 58.5 | 58.5 | 58.5 | 58.5 | 58.5 |
| (b) | Divinylbenzene | (part) | 41.5 | 41.5 | 41.5 | 41.5 | 41.5 |
| (c) | Dicumyl peroxide | (part) | 1.0 | 1.0 | 1.0 | 1.0 | 1.0 |
| (d) | Sulfur | (part) | 0.1 | 0.2 | 0 | 0.3 | 0.4 |

Physical properties of the above obtained cured rubber sheets are shown in the following Table 2.

Table 2

| Physical property | | Example | | Comparative Example | | |
|---|---|---|---|---|---|---|
| | | 2 | 3 | 2 | 3 | 4 |
| Tensile strength at room temperature | (Kg/cm$^2$) | 266 | 258 | 288 | 250 | soft sheet |
| Elongation at room temperature | (%) | 340 | 368 | 295 | 480 | |
| Modulus at room temperature | (Kg/cm$^2$) | 230 | 241 | 186 | 142 | |
| Tear energy at room temperature | (Kg/cm) | 18 | 21 | 9 | — | |

It is clear from the comparison of Examples 2 and 3 with Comparative Example 2 that, when the addition amount of sulfur is not more than 0.2 part, the Young's modulus and tear energy of the cured rubber sheets are remarkably improved. However, when the addition amount of sulfur is not less than 0.3 part, the Young's modulus of the cured rubber sheet is low, and as the increase of the amount of sulfur, the sheet becomes soft and finally becomes unfit for practical use.

EXAMPLES 4 TO 8 AND COMPARATIVE EXAMPLE 5

The effect of Mooney viscosity of ethylene-propylene copolymer was examined. Table 3 shows Mooney viscosities and structures of the ethylene-propylene copolymers used in this test.

Table 3

| Ethylene-propylene copolymer | Mooney viscosity | Iodine value | Ethylene/propylene ratio |
|---|---|---|---|
| E-2 | 95 | 1 | 74/26 |
| E-3 | 90 | 12 | 55/45 |
| E-4 | 80 | 0 | 73/27 |
| E-5 | 80 | 0 | 51/49 |
| E-1 | 90 | 12 | 70/30 |
| E-6 | 120 | 12 | 61/39 |
| E-7 | 50 | 3 | 50/50 |

The ethylene-propylene copolymers listed in the above Table 3 were used, and the following ingredients, (a) ethylene-propylene copolymer, (b) divinylbenzene, (c) dicumyl peroxide and (d) sulfur were kneaded according to the following Compounding Recipe 3 at room temperature by means of a mixing roll. The resulting homogeneous rubber compositions were heated and cured at 155°C for 30 minutes to produce cured rubber sheets.

Physical properties of the cured rubber sheets are shown in the following Table 5.

EXAMPLES 9 TO 12 AND COMPARATIVE EXAMPLES 6 TO 8

The following ingredients, (a) ethylene-propylene copolymer, (b) divinylbenzene, (c) dicumyl peroxide and (d) sulfur were kneaded according to the following Compounding Recipe 4 at room temperature by means of a mixing roll. The resulting homogeneous rubber compositions were heated and cured at 155°C for 30 minutes to produce cured rubber sheets.

Physical properties of the resulting cured rubber sheets are shown in the following Table 6.

Compounding Recipe 3

| Ingredient | | | Example 4 | 5 | 6 | 7 | 8 | Comparative Example 5 |
|---|---|---|---|---|---|---|---|---|
| (a) | Kind of ethylene-propylene copolymer | | E-2 | E-3 | E-4 | E-5 | E-1/E-6 =7/3 | E-7 |
| (a) | Amount of the copolymer | (part) | 58.5 | 58.5 | 58.5 | 58.5 | 58.5 | 58.5 |
| (b) | Divinylbenzene | (part) | 41.5 | 41.5 | 41.5 | 41.5 | 41.5 | 41.5 |
| (c) | Dicumyl peroxide | (part) | 1.0 | 1.0 | 1.0 | 1.0 | 1.0 | 1.0 |
| (d) | Sulfur | (part) | 0.15 | 0.15 | 0.15 | 0.15 | 0.15 | 0.15 |

Table 5

| Physical property | | Example 4 | 5 | 6 | 7 | 8 | Comparative Example 5 |
|---|---|---|---|---|---|---|---|
| Tensile strength at room temperature | (Kg/cm²) | 300 | 271 | 311 | 203 | 309 | 167 |
| Elongation at room temperature | (%) | 450 | 395 | 415 | 430 | 385 | 380 |
| Modulus at room temperature | (Kg/cm²) | 329 | 289 | 296 | 223 | 297 | 254 |
| Tear energy at room temperature | (Kg/cm) | 29 | 11 | 19 | 17 | 17 | 9 |
| Creep at room temperature (20Kg/cm² stress) | (%) | 1.3 | 0.9 | 1.6 | 1.5 | 0.3 | — |
| Creep at 70°C (20Kg/cm² stress) | (%) | 2.0 | 0.8 | 0.6 | 0.7 | 1.3 | — |
| Retention of tensile strength at 70°C | (%) | 54 | 52 | 65 | 66 | 53 | — |
| Retention of elongation at 70°C | (%) | 54 | 75 | 85 | 74 | 71 | — |
| Retention of modulus at 70°C | (%) | 76 | 70 | 65 | 80 | 73 | — |

Comparison of Examples 4 to 8 with Comparative Example 5 clearly shows that the cured rubber sheet obtained from the rubber composition, which uses ethylene-propylene copolymer having a Mooney viscosity lower than the lower limit defined in the present invention, has not desired tensile strength and tear energy.

Compounding Recipe 4

| Ingredient | | | Example 9 | 10 | 11 | 12 | Comparative Example 6 | 7 | 8 |
|---|---|---|---|---|---|---|---|---|---|
| (a) | Kind of ethylene-propylene copolymer | | E-1 | E-2 | E-6 | E-4 | E-1 | E-1 | E-1 |
| (a) | Amount of the copolymer | (part) | 54.5 | 63.6 | 63.6 | 63.6 | 68.7 | 79 | 89.4 |
| (b) | Divinylbenzene | (part) | 45.5 | 36.4 | 36.4 | 36.4 | 31.3 | 21 | 10.6 |
| (c) | Dicumyl peroxide | (part) | 0.75 | 1.0 | 1.0 | 1.0 | 1.0 | 1.0 | 1.0 |
| (d) | Sulfur | (part) | 0.1 | 0.15 | 0.15 | 0.15 | 0 | 0 | 0 |

Table 6

| Physical property | | Example 9 | 10 | 11 | 12 | Comparative Example 6 | 7 | 8 |
|---|---|---|---|---|---|---|---|---|
| Tensile strength at room temperature | (Kg/cm²) | 261 | 292 | 219 | 268 | 178 | 181 | 85 |

Table 6-continued

| Physical property | | Example 9 | Example 10 | Example 11 | Example 12 | Comparative Example 6 | Comparative Example 7 | Comparative Example 8 |
|---|---|---|---|---|---|---|---|---|
| Elongation at room temperature | (%) | 390 | 550 | 320 | 420 | >530 | >600 | 670 |
| Modulus at room temperature | (Kg/cm$^2$) | 323 | 271 | 202 | 234 | 83 | 50 | 32 |
| Tear energy at room temperature | (Kg/cm) | 16 | 33 | 15 | 21 | — | — | 7 |

Note:
All of the cured rubber sheets obtained in Examples 9 to 12 had desired values in the retention of physical properties at 70°C and in the creeps at room temperature and at 70°C.

It can be seen from Examples 9 to 12 in Table 6 that the ratio of rubber/monomer can be widely changed in the rubber composition of the present invention. Comparative Examples 6, 7 and 8, which are carried out according to the method disclosed in British Pat. No. 896,598, show that cured rubber sheets prepared from rubber compositions, which contains monomer in an amount smaller than the lower limit defined in the present invention and further do not contain sulfur, have a low Young's modulus and a poor tensile strength, and such rubber compositions cannot satisfy the object of the present invention.

EXAMPLE 13 AND COMPARATIVE EXAMPLES 9 AND 10

The influence of the molecular weight (defined by the Mooney viscosity) of ethylene-propylene copolymer upon the physical properties of cured rubber was examined more minutely.

The molecular structures of the copolymers used in this test are shown in the following Table 7.

Table 7

| Ethylene-propylene copolymer | Mooney viscosity | Iodine value | Ethylene/propylene ratio |
|---|---|---|---|
| E-8 | 40 | 12 | 50/50 |
| E-9 | 60 | 12 | 55/45 |
| E-3 | 90 | 12 | 55/45 |

The following ingredients, (a) ethylene-propylene copolymers, (b) divinylbenzene, (c) dicumyl peroxide and (d) sulfur were kneaded according to the following Compounding Recipe 5 at room temperature by means of a mixing roll. The resulting homogeneous rubber compositions were heated and cured at 155°C for 30 minutes to produce cured rubber sheets.

Physical properties of the resulting cured rubber sheets are shown in the following Table 8.

Compounding Recipe 5

| Ingredient | | Example 13 | Comparative Example 9 | Comparative Example 10 |
|---|---|---|---|---|
| (a) Kind of ethylene-propylene copolymer | | E-3 | E-8 | E-9 |
| (a) Amount of the copolymer | (part) | 58.5 | 58.5 | 58.5 |
| (b) Divinylbenzene | (part) | 41.5 | 41.5 | 41.5 |
| (c) Dicumyl peroxide | (part) | 1.0 | 1.0 | 1.0 |
| (d) Sulfur | (part) | 0.15 | 0.15 | 0.15 |

Table 8

| Physical property | Example 13 | Comparative Example 9 | Comparative Example 10 |
|---|---|---|---|
| Tensile strength at room temperature (Kg/cm$^2$) | 236 | 103 | 149 |
| Elongation at room temperature (%) | 400 | 250 | 340 |
| Modulus at room temperature (Kg/cm$^2$) | 257 | 182 | 201 |
| Tear energy at room temperature (Kg/cm) | 17 | 10 | — |

It can be seen from Table 6 that, when EPDM having substantially the same ethylene/propylene ratio and iodine value is used, only EPDM having a Mooney viscosity of 90 (E-3) can provide a cured rubber sheet having the desired tensile strength at room temperature.

EXAMPLE 14 AND COMPARATIVE EXAMPLE 11

The influence of ethylene/propylene ratio of the ethylene-propylene copolymer upon the physical properties of the cured rubber were examined. Molecular structure of the ethylene-propylene copolymers to be used in this test are shown in the above Table 3.

The following ingredients, (a) ethylene-propylene copolymer, (b) divinylbenzene, (c) dicumyl peroxide and (d) sulfur were kneaded according to the following Compounding Recipe 6 at room temperature by means of a mixing roll. The resulting homogeneous rubber compositions were heated and cured at 155°C for 30 minutes to produce cured rubber sheets.

Physical properties of the resulting cured rubber sheets are shown in the following Table 9.

Compounding Recipe 6

| Ingredient | | Example 14 | Comparative Example 11 |
|---|---|---|---|
| (a) Kind of ethylene-propylene copolymer | | E-2 | E-7 |
| (a) Ethylene/propylene ratio in the copolymer | | 74/26 | 50/50 |
| (a) Amount of the copolymer | (part) | 58.5 | 58.5 |
| (b) Divinylbenzene | (part) | 41.5 | 41.5 |
| (c) Dicumyl peroxide | (part) | 1.0 | 1.0 |
| (d) Sulfur | (part) | 0.15 | 0.15 |

Table 9

| Physical property | Example 14 | Comparative Example 11 |
|---|---|---|
| Tensile strength at room temperature (Kg/cm$^2$) | 300 | 170 |
| Elongation at room temperature (%) | 450 | 390 |
| Modulus at room temperature (Kg/cm$^2$) | 329 | 126 |
| Tear energy at room temperature (Kg/cm) | 29 | 19 |

As seen from Table 9, as the ethylene/propylene ratio is larger, the Young's modulus and tensile strength of the cured rubber sheet are higher.

EXAMPLES 15 AND 16

The influence of ethylene/propylene ratio in the ethylene-propylene copolymer upon the heat resistance of cured rubber was examined. The molecular structures of ethylene-propylene copolymers to be used in this test are shown in the above Table 3.

The following ingredients, (a) ethylene-propylene copolymer, (b) divinylbenzene, (c) dicumyl peroxide and (d) sulfur were kneaded according to the following Compounding Recipe 7 at room temperature by means of a mixing roll. The resulting homogenous rubber compositions were heated and cured at 155°C for 30 minutes to produce cured rubber sheets.

Physical properties of the resulting cured rubber sheets are shown in the following Table 10.

Compounding Recipe 7

| Ingredient | | Example 15 | Example 16 |
| --- | --- | --- | --- |
| (a) Kind of ethylene-propylene copolymer | | E-2 | E-3 |
| (a) Amount of the copolymer | (part) | 58.5 | 58.5 |
| (b) Divinylbenzene | (part) | 41.5 | 41.5 |
| (c) Dicymyl peroxide | (part) | 1.0 | 1.0 |
| (d) Sulfur | (part) | 0.15 | 01.5 |

Table 10

| Physical property | | Example 15 | Example 16 |
| --- | --- | --- | --- |
| Tensile strength at room temperature | $(Kg/cm^2)$ | 295 | 271 |
| Elongation at room temperature | (%) | 370 | 395 |
| Modulus at room temperature | $(Kg/cm^2)$ | 426 | 289 |
| Tear energy at room temperature | (Kg/cm) | 15 | 11 |
| Creep at room temperature (20 Kg/cm² stress) | (%) | 1.3 | 0.9 |
| Creep at 70°C (20 Kg/cm² stress) | (%) | 2.0 | 0.8 |
| Retention of tensile strength at 70°C | (%) | 53 | 60 |
| Retention of elongation at 70°C | (%) | 87 | 75 |
| Retention of modulus at 70°C | (%) | 50 | 70 |

As seen from Table 10, as the ethylene/propylene ratio is smaller, the cured rubber sheet is more excellent in the retention of physical properties at high temperature.

EXAMPLES 17 TO 19

The influence of ethylene/propylene ratio in the ethylene-propylene copolymer upon the creeps at room temperature and at 70°C was examined. Samples of Examples 17, 18 and 19 to be used for the examination of creep are cured rubber sheets produced in Examples 13, 1 and 14, respectively. The molecular structures of the ethylene-propylene copolymers used in Examples 17 to 19 and the values of creep of the resulting cured rubber sheets are shown in the following Table 11.

Table 11

| | Example 17 | Example 18 | Example 19 |
| --- | --- | --- | --- |
| Kind of ethylene-propylene copolymer | E-3 | E-1 | E-2 |
| Mooney viscosity | 90 | 90 | 90 |
| Ethylene/propylene ratio | 55/45 | 70/30 | 74/26 |
| Creep at room temperature (%) | 1.1 | 1.3 | 1.3 |
| Creep at 70°C (%) | 1.0 | 1.6 | 1.8 |

As seen from Table 11, as the propylene content in the ethylene-propylene copolymer is higher, both of the creep at room temperature and that at high temperature lower.

EXAMPLE 20

A mixture composed of (a) 60 parts by volume of ethylene-propylene copolymer E-1, (b) 40 parts by volume of divinylbenzene (the ingredient (a) being 58.5 parts by weight and the ingredient (b) being 41.5 parts by weight), (c) 1.0 part by weight of dicumyl peroxide, (d) 0.15 part by weight of sulfur and (e) 3.0 parts by weight of HAF carbon black was kneaded at room temperature by means of a mixing roll. The resulting homogeneous rubber composition was heated and cured at 155°C for 30 minutes to produce a cured rubber sheet.

Physical properties of the resulting cured rubber sheet are shown in the following Table 12.

Table 12

| Physical property | | Example 20 |
| --- | --- | --- |
| Tensile strength at room temperature | $(Kg/cm^2)$ | 257 |
| Elongation at room temperature | (%) | 300 |
| Modulus at room temperature | $(Kg/cm^2)$ | 244 |
| Tear energy at room temperature | (Kg/cm) | 12 |
| Retention of physical properties after outdoor exposure* | | |
| Tensile strength at room temperature | (%) | 99 |
| Elongation at room temperature | (%) | 90 |
| Modulus at room temperature | (%) | 133 |

*Cured rubber sheet was exposed out of doors for 40 days under 10% elongation.

As seen from Table 12, the cured rubber sheet produced from a rubber composition containing 3 parts, based on 100 parts of a mixture of ethylene-propylene copolymer and divinylbenzene, of carbon black has desired physical properties at room temperature and further has remarkably excellent light stability.

EXAMPLES 21 AND 22

The following ingredients, (a) ethylene-propylene copolymer, (b) divinylbenzene, (c) organic peroxide and (d) sulfur were kneaded according to the following Compounding Recipe 8 at room temperature by means of a mixing roll. The resulting homogeneous rubber compositions were heated and cured at 155°C for 30 minutes to produce cured rubber sheets.

Physical properties of the resulting cured rubber sheets are shown in the following Table 13.

Compounding Recipe 8

|   | Ingredient |   | Ex. 21 | Ex. 22 |
|---|---|---|---|---|
| (a) | Kind of ethylene-propylene copolymer |   | E-4 | E-4 |
| (a) | Amount of the copolymer | (part) | 58.5 | 58.5 |
| (b) | Divinylbenzene | (part) | 41.5 | 41.5 |
| (c) | Organic peroxide |   |   |   |
|   | 1,1-Bis-t-butylperoxy-3,3,5-trimethylcyclohexane | (part) | 1.0 | 0 |
|   | 2,5-Dimethyl-2,5-di-t-butyl-peroxyhexane | (part) | 0 | 1.0 |
| (d) | Sulfur | (part) | 0.15 | 0.15 |

Table 13

| Physical property |   | Ex. 21 | Ex. 22 |
|---|---|---|---|
| Tensile strength at room temperature | (Kg/cm$^2$) | 224 | 217 |
| Elongation at room temperature) | (%) | 480 | 510 |
| Modulus at room temperature | Kg/cm$^2$) | 380 | 293 |
| Tear energy at room temperature | (Kg/cm) | 25 | 35 |
| Retention of tensile strength at 70°C | (%) | 58 | 52 |
| Retention of elongation at 70°C | (%) | 87 | 85 |
| Retention of modulus at 70°C | (%) | 67 | 54 |

It can be seen from Table 13 that, besides dicumyl peroxide, various dialkyl peroxides can be used in the present invention.

EXAMPLES 23 AND 24

The following ingredients, (a) ethylene-propylene copolymer, (b) divinylbenzene, (c) dicumyl peroxide, (d) sulfur, and (e) red iron oxide were kneaded according to the following Compounding Recipe 9 at room temperature by means of a mixing roll. The resulting homogeneous rubber compositions were heated and cured at 160°C for 30 minutes to produce cured rubber sheets.

Physical properties of the resulting cured rubber sheets are shown in the following Table 14.

Compounding Recipe 9

|   | Ingredient |   | Example 23 | Example 24 |
|---|---|---|---|---|
| (a) | Kind of ethylene-propylene copolymer |   | E-1 | E-1 |
| (a) | Amount of the copolymer | (part) | 58.5 | 58.5 |
| (b) | Divinylbenzene | (part) | 41.5 | 41.5 |
| (c) | Dicumyl peroxide | (part) | 1.0 | 1.0 |
| (d) | Sulfur | (part) | 0.15 | 0.15 |
| (e) | Red iron oxide | (part) | 3.0 | 0 |

Table 14

| Physical property |   | Ex. 23 | Ex. 24 |
|---|---|---|---|
| Tensile strength at room temperature | (Kg/cm$^2$) | 291 | 324 |
| Elongation at room temperature | (%) | 335 | 355 |
| Modulus at room temperature | (Kg/cm$^2$) | 223 | 243 |
| Tear energy at room temperature | (Kg/cm) | 14 | 14 |
| Retention of physical properties after outdoor exposure* |   |   |   |
| Tensile strength at room temperature | (%) | 96 | 33 |
| Elongation at room temperature | (%) | 94 | 80 |
| Modulus at room temperature | (%) | 123 | 119 |

*Cured rubber sheet was exposed out of doors for 9 days without elongation.

As seen from Example 23, the cured rubber sheet produced from a composition containing 3 parts, based on 100 parts of a mixture of ethylene-propylene copolymer and divinylbenzene, or red iron oxide has desired physical properties at room temperature, and further the cured rubber sheet is remarkably superior in the light stability to a cured rubber sheet containing no red iron oxide.

EXAMPLES 25 TO 31

The following ingredients, (a) ethylene-propylene copolymer E-1, (b) divinylbenzene, (c) dicumyl peroxide, (d) sulfur and (e) ultraviolet absorbing agent were kneaded according to the following Compounding Recipe 10 at room temperature by means of a mixing roll. The resulting homogeneous rubber compositions were heated and cured at 160°C for 30 minutes to produce cured ruber sheets.

Physical properties and light stability of the resulting cured rubber sheets are shown in the following Table 15.

Compounding Recipe 10

|   | Ingredient |   | Example 25 | Example 26 | Example 27 | Example 28 | Example 29 | Example 30 | Example 31 |
|---|---|---|---|---|---|---|---|---|---|
| (a) | Kind of ethylene-propylene copolymer |   | E-1 | E-1 | E-1 | E-1 | E-1 | E-1 | E-1 |
| (a) | Amount of the copolymer | (part) | 58.5 | 58.5 | 58.5 | 58.5 | 58.5 | 58.5 | 58.5 |
| (b) | Divinylbenzene | (part) | 41.5 | 41.5 | 41.5 | 41.5 | 41.5 | 41.5 | 41.5 |
| (c) | Dicumyl peroxide | (part) | 1.0 | 1.0 | 1.0 | 1.0 | 1.0 | 1.0 | 1.0 |
| (d) | Sulfur | (part) | 0.15 | 0.15 | 0.15 | 0.15 | 0.15 | 0.15 | 0.15 |
| (e) | Ultraviolet absorbing agent |   |   |   |   |   |   |   |   |
|   | Kind |   | A | B | C | D | E | B+E |   |

Compounding Recipe 10-continued

| Ingredient | Example 25 | Example 26 | Example 27 | Example 28 | Example 29 | Example 30 | Example 31 |
|---|---|---|---|---|---|---|---|
| Amount | 1.0 | 1.0 | 1.0 | 1.0 | 1.0 | 1.0 | 0 |

A:6-chloro-2-(2'-hydroxy-3'-t-butyl-5'-methyl)benzotriazole
B:2-hydroxy-4-n-octoxybenzophenone
C:2,2'-thiobis(4-t-octyl phenolate)-n-butylamine nickel
D:2'-hydroxy-4'-n-octoxybenzotriazole
E:nickel dibutyldithiocarbamate
B+E:a mixture of B and E in the same weight.

Table 15

| Physical property | | Example 25 | Example 26 | Example 27 | Example 28 | Example 29 | Example 30 | Example 31 |
|---|---|---|---|---|---|---|---|---|
| Tensile strength at room temperature | (Kg/cm²) | 300 | 331 | 291 | 330 | 328 | 316 | 324 |
| Elongation at room temperature | (%) | 340 | 350 | 350 | 370 | 375 | 365 | 355 |
| Modulus at room temperature | (Kg/cm²) | 221 | 253 | 243 | 208 | 233 | 214 | 243 |
| Tear energy at room temperature | (Kg/cm) | 14 | 13 | 15 | 15 | 17 | 16 | 14 |
| Retention of physical properties after outdoor exposure* | | | | | | | | |
| Tensile strength at room temperature | (%) | 93 | 88 | 101 | 83 | 89 | 92 | 33 |
| Elongation at room temperature | (%) | 95 | 80 | 77 | 83 | 97 | 96 | 80 |
| Modulus at room temperature | (%) | 111 | 101 | 109 | 116 | 103 | 106 | 119 |
| Tear energy at room temperature | (%) | 91 | 94 | 88 | 83 | 96 | 93 | 44 |

*Cured rubber sheet was exposed out of doors for 9 days under 10% elongation.

As seen from Table 15, when ultraviolet absorbing agent is added to the rubber composition of the present invention, the retention of tensile strength and the retention of tear energy after outdoor exposure of the resulting cured rubber sheet are remarkably improved. Particularly, 6-chloro-2-(2'-hydroxy-3'-t-butyl-5'-methyl)benzotriazole and a mixture of 2-hydroxy-4-n-octoxybenzophenone and nickel dibutyldithiocarbamate in the same weight are effective.

EXAMPLES 32 TO 34

The following ingredients, (a) ethylene-propylene copolymer containing ethylidenenorbornene as an unsaturated third component, which has a Mooney viscosity of 120, an ethylene/propylene ratio of 70/30 and an iodine value of 15 (hereinafter this copolymer is referred to as E-8), (b) divinylbenzene, (c) dicumyl peroxide, (d) sulfur, (e') MCC carbon black and (e''') nickel dibutyldithiocarbamate were kneaded according to the following Compounding Recipe 11 at room temperature by means of a mixing roll. The resulting homogeneous rubber compositions were heated and cured at 155°C for 30 minutes to produce cured rubber sheets.

Physical properties and light stability of the resulting cured rubber sheets are shown in the following Table 16.

Compounding Recipe 11

| | Ingredient | | Example 32 | Example 33 | Example 34 |
|---|---|---|---|---|---|
| (a) | Kind of ethylene-propylene copolymer | | E-8 | E-8 | E-8 |
| (a) | Amount of the copolymer | (part) | 64 | 64 | 64 |
| (b) | Divinylbenzene | (part) | 36 | 36 | 36 |
| (c) | Dicumyl peroxide | (part) | 1 | 1 | 1 |
| (d) | Sulfur | (part) | 0.15 | 0.15 | 0.15 |
| (e') | MCC Carbon black | (part) | 2 | 4 | 4 |
| (e''') | Nickel dibutyldithio-carbamate | (part) | 0 | 0 | 1 |

Table 16

| Physical property | | Example 32 | Example 33 | Example 34 |
|---|---|---|---|---|
| Tensile strength at room temperature | (Kg/cm²) | 462 | 408 | 420 |
| Elongation at room temperature | (%) | 380 | 405 | 420 |
| Modulus at room temperature | (Kg/cm²) | 324 | 315 | 317 |
| Tear energy at room temperature | (Kg/cm) | 25 | 31 | 34 |
| Retention of physical | | | | |

Table 16-continued

| Physical property | | Example 32 | Example 33 | Example 34 |
|---|---|---|---|---|
| properties after outdoor exposure* | | | | |
| Tensile strength at room temperature | (%) | 80 | 102 | 99 |
| Elongation at room temperature | (%) | 90 | 91 | 91 |
| Modulus at room temperature | (%) | 108 | 119 | 123 |
| Tear energy at room temperature | (%) | 80 | 87 | 89 |

*Cured rubber sheet was exposed out of doors for 1 month under 10% elongation.

As seen from Table 16, when MCC carbon black having a grain size smaller than that of HAF carbon black or a mixture of MCC carbon black and nickel dibutyldithiocarbamate is added to the rubber composition of the present invention, the resulting cured rubber sheet has a remarkably improved retention of physical properties after outdoor exposure.

EXAMPLES 35 AND 36

The following ingredients, (a) ethylene-propylene copolymer E-8, (b) divinylbenzene, (c) dicumyl peroxide, (d) sulfur and (e'') a mixture of ultraviolet absorbing agent and pigment were kneaded according to the following Compounding Recipe 12 at room temperature by means of a mixing roll. The resulting homogeneous rubber compositions were heated and cured at 155°C for 30 minutes to produce cured rubber sheets.

Physical properties and light stability of the cured rubber sheets are shown in the following Table 17.

Compounding Recipe 12

| | Ingredient | | Example 35 | Example 36 |
|---|---|---|---|---|
| (a) | Kind of ethylene-propylene copolymer | | E-8 | E-8 |
| (a) | Amount of the copolymer | (part) | 64 | 64 |
| (b) | Divinylbenzene | (part) | 36 | 36 |
| (c) | Dicumyl peroxide | (part) | 1.0 | 1.0 |
| (d) | Sulfur | (part) | 0.15 | 0.15 |
| (e'') | Ultraviolet absorbing agent A | (part) | 3 | 3 |
| (e'') | Pigment | | | |
| | Phthalocyanine Green | (part) | 3 | 0 |
| | Permanent Carmine | (part) | 0 | 3 |

Table 17

| Physical property | | Ex. 35 | Ex. 36 |
|---|---|---|---|
| Tensile strength at room temperature | (Kg/cm$^2$) | 388 | 384 |
| Elongation at room temperature | (%) | 328 | 330 |
| Modulus at room temperature | (Kg/cm$^2$) | 265 | 250 |
| Tear energy at room temperature | (Kg/cm) | 20 | 21 |
| Retention of physical properties after outdoor exposure* | | | |
| Tensile strength at room temperature | (%) | 80 | 89 |
| Elongation at room temperature | (%) | 85 | 88 |
| Modulus at room temperature | (%) | 116 | 104 |
| Tear energy of at room temperature | (%) | 95 | 96 |

*Cured rubber sheet was exposed out of doors for 1 month under 10% elongation.

As seen from Table 17, a mixture of ultraviolet absorbing agent and pigment also provides cured rubber sheets having a remarkably improved retention of physical properties after outdoor exposure.

What is claimed is:

1. An ethylene-propylene copolymer rubber composition having a high Young's modulus, which comprises 100 parts by weight of a mixture of the following ingredients (a) and (b) in a weight ratio of ingredient (a)/ingredient (b) of 67/33–50/50, said ingredient (a) being an ethylene-propylene copolymer having a Mooney viscosity of at least 75, which may contain an unsaturated third component, and said ingredient (b) being divinylbenzene, (c) 0.3–2.5 parts by weight of an organic peroxide, and (d) 0.01–0.25 part by weight of sulfur, said rubber composition when cured at 120–180°C being homogeneous and having a Young's modulus of 200–500 Kg/cm$^2$, a tensile strength of at least 200 Kg/cm$^2$, an elongation of at least 300%, a tear energy Γ of at least 10 Kg/cm, and retentions of Young's modulus and tensile strength at 70°C of at least 50%.

2. An ethylene-propylene copolymer rubber composition having a high Young's modulus, which comprises 100 parts by weight of a mixture of the following ingredients (a) and (b) in a weight ratio of ingredient (a)/ingredient (b) of 67/33–50/50, said ingredient (a) being an ethylene-propylene copolymer having a Mooney viscosity of at least 75, which may contain an unsaturated third component, and said ingredient (b) being divinylbenzene, (c) 0.3–2.5 parts by weight of an organic peroxide, (d) 0.01–0.25 part by weight of sulfur, and (e) 0.1–5.0 parts by weight of an ultraviolet absorbing agent, said rubber composition when cured at 120–180°C being homogeneous and having a Young's modulus of 200–500 Kg/cm$^2$, a tensile strength of at least 200 Kg/cm$^2$, an elongation of at least 300%, a tear energy Γ of at least 10 Kg/cm, and retentions of Young's modulus and tensile strength at 70°C of at least 50%.

3. An ethylene-propylene copolymer rubber composition having a high Young's modulus, which comprises 100 parts by weight of a mixture of the following ingredients (a) and (b) in a weight ratio of ingredient (a)/ingredient (b) of 67/33–50/50, said ingredient (a) being an ethylene-propylene copolymer having a Mooney viscosity of at least 75, which may contain an unsaturated third component, and said ingredient (b) being divinylbenzene, (c) 0.3–2.5 parts by weight of an organic peroxide,
(d) 0.01–0.25 part by weight of sulfur, and
(e') 1–10 parts by weight of carbon black and/or red iron oxide, said rubber composition when cured at 120–180°C being homogeneous and having a Young's modulus of 200–500 Kg/cm$^2$, a tensile strength of at least 200 Kg/cm$^2$, an elongation of at least 300%, a tear energy $\Gamma$ of at least 10 Kg/cm, and retentions of Young's modulus and tensile strength at 70°C of at least 50%.

4. An ethylene-propylene copolymer rubber composition having a high Young's modulus, which comprises
100 parts by weight of a mixture of the following ingredients (a) and (b) in a weight ratio of ingredient (a)/ingredient (b) of 67/33–50/50,
said ingredient (a) being an ethylene-propylene copolymer having a Mooney viscosity of at least 75, and
said ingredient (b) being divinylbenzene,
(c) 0.3–2.5 parts by weight of an organic peroxide,
(d) 0.01–0.25 part by weight of sulfur, and
(e'') 1–10 parts by weight of a mixture of ultraviolet absorbing agent and pigment, said rubber composition when cured at 120–180°C being homogeneous and having a Young's modulus of 200–500 Kg/cm$^2$, a tensile strength of at least 200 Kg/cm$^2$, an elongation of at least 300%, a tear energy $\Gamma$ of at least 10 Kg/cm, and retentions of Young's modulus and tensile strength at 70°C of at least 50%.

5. An ethylene-propylene copolymer rubber composition having a high Young's modulus, which comprises
100 parts by weight of a mixture of the following ingredients (a) and (b) in a weight ratio of ingredient (a)/ingredient (b) of 67/33–50/50,
said ingredient (a) being an ethylene-propylene copolymer having a Mooney viscosity of at least 75, and
said ingredient (b) being divinylbenzene,
(c) 0.3–2.5 parts by weight of an organic peroxide,
(d) 0.01–0.25 part by weight of sulfur, and
(e''') 1–10 parts by weight of a mixture of ultraviolet absorbing agent and at least one of carbon black and red iron oxide, said rubber composition when cured at 120–180°C being homogeneous and having a Young's modulus of 200–500 Kg/cm$^2$, a tensile strength of at least 200 Kg/cm$^2$, an elongation of at least 300%, a tear energy $\Gamma$ of at least 10 Kg/cm, and retentions of Young's modulus and tensile strength at 70°C of at least 50%.

6. A rubber composition according to claim 1, wherein said ethylene-propylene copolymer is a rubbery copolymer having a Mooney viscosity of at least 75 and containing 40–80% of ethylene unit, 60–20% of propylene unit and 0–10% of unsaturated component unit.

7. A rubber composition according to claim 1, wherein the weight ratio of ethylene-propylene copolymer/divinylbenzene is 65/35–55/45.

8. A rubber composition according to claim 1, wherein said organic peroxide is dicumyl peroxide, di-t-butyl peroxide, 1,1-di-t-butyl-3,3,5-peroxycyclohexane, t-butyl cumyl peroxide or 2,5-dimethyl-2,5-di-t-butylperoxyhexane.

9. A rubber composition according to claim 1, wherein said organic peroxide is dicumyl peroxide.

10. A rubber composition according to claim 1, wherein the amount of said organic peroxide is 0.5–1.5 parts by weight based on 100 parts by weight of the total amount of ethylene-propylene copolymer and divinylbenzene.

11. A rubber composition according to claim 1, wherein the amount of sulfur is 0.03–0.16 part by weight based on 100 parts by weight of the total amount of ethylene-propylene copolymer and divinylbenzene.

12. A rubber composition according to claim 2, wherein said ultraviolet absorbing agent is 6-chloro-2-(2'-hydroxy-3'-t-butyl-5'-methyl)benzotriazole, 2-hydroxy-4-n-octoxybenzophenone, 2,2'-thiobis-(4-t-octyl phenolate)-n-butylamine nickel, 2'-hydroxy-4'-n-octoxybenzotriazole, nickel dibutyldithiocarbamate or a mixture of 2-hydroxy-4-n-octoxybenzophenone and nickel dibutyldithiocarbamate in the same weight.

13. A rubber composition according to claim 2, wherein the amount of said ultraviolet absorbing agent is 0.5–4.0 parts by weight based on 100 parts by weight of the total amount of ethylene-propylene copolymer and divinylbenzene.

14. A rubber composition according to claim 4, wherein said pigment is Phthalocyanine Green or Permanent Carmine.

15. A rubber composition according to claim 5, wherein said ultraviolet absorbing agent is 2,2'-thiobis-(4-t-octyl phenolate)-n-butylamine nickel or nickel dibutyldithiocarbamate.

* * * * *